(12) United States Patent
Macklin

(10) Patent No.: US 8,539,753 B2
(45) Date of Patent: Sep. 24, 2013

(54) HYBRID ROCKET MOTOR WITH ANNULAR, CONCENTRIC SOLID FUEL ELEMENTS

(75) Inventor: Frank Macklin, Poway, CA (US)

(73) Assignee: SpaceDev, Inc., Poway, CA (US)

( * ) Notice: Subject to any disclaimer, the term of this patent is extended or adjusted under 35 U.S.C. 154(b) by 1184 days.

(21) Appl. No.: 11/764,677

(22) Filed: Jun. 18, 2007

(65) Prior Publication Data

US 2009/0211226 A1    Aug. 27, 2009

Related U.S. Application Data

(60) Provisional application No. 60/818,001, filed on Jun. 29, 2006.

(51) Int. Cl.
*F02K 9/28* (2006.01)

(52) U.S. Cl.
USPC .................................. 60/253; 60/255; 60/257

(58) Field of Classification Search
USPC ................... 60/251, 253, 255, 257–260, 769, 60/39.464, 39.465
See application file for complete search history.

(56) References Cited

U.S. PATENT DOCUMENTS

| | | | | |
|---|---|---|---|---|
| 3,214,906 A | * | 11/1965 | Coleal | 60/231 |
| 3,298,182 A | | 1/1967 | Webb | |
| 3,354,647 A | | 11/1967 | Aycock | |
| 3,447,326 A | | 6/1969 | Fuller | |
| 3,507,296 A | | 4/1970 | Fix et al. | |
| 3,555,824 A | | 1/1971 | Buse et al. | |
| 3,698,642 A | * | 10/1972 | McCullough | 239/265.23 |
| 3,759,039 A | * | 9/1973 | Williams | 60/231 |
| 4,424,679 A | | 1/1984 | Holzman | |
| 4,802,333 A | | 2/1989 | Smith | |
| 4,880,185 A | | 11/1989 | Apfel | |
| 5,026,259 A | | 6/1991 | Whitehead et al. | |
| 5,119,627 A | | 6/1992 | Bradford et al. | |
| 5,579,636 A | | 12/1996 | Rosenfield | |
| 5,582,001 A | | 12/1996 | Bradford et al. | |
| 5,694,769 A | | 12/1997 | Akiba et al. | |
| 5,714,711 A | * | 2/1998 | Schumacher et al. | 102/291 |
| 6,092,366 A | * | 7/2000 | Smith et al. | 60/251 |
| 6,354,074 B1 | | 3/2002 | Jones et al. | |
| 6,393,830 B1 | | 5/2002 | Hamke et al. | |
| 6,470,669 B2 | * | 10/2002 | Jones et al. | 60/231 |
| 6,679,047 B1 | | 1/2004 | Uematsu et al. | |
| 6,880,326 B2 | | 4/2005 | Karabeyoglu et al. | |
| 7,069,717 B2 | | 7/2006 | Macklin et al. | |
| 2002/0121081 A1 | | 9/2002 | Cesaroni et al. | |
| 2005/0188677 A1 | * | 9/2005 | Nyberg et al. | 60/234 |
| 2006/0064963 A1 | | 3/2006 | Macklin et al. | |
| 2006/0213181 A1 | | 9/2006 | Sarigul-Klijn et al. | |

OTHER PUBLICATIONS

Space Daily "Surrey fires micro electric thruster" Oct. 25, 1999 http://www.spacedaily.com/news/microsat-99j.html.
Williams et al. "Almost There: Responsive Space" AIAA 2nd Responsive Space Conference 2004 RS2-2004-8000; Apr. 19-22, 2004; Los Angeles, CA.

\* cited by examiner

*Primary Examiner* — Andrew Nguyen
(74) *Attorney, Agent, or Firm* — Fred C. Hernandez; Mintz Levin Cohn Ferris Glovsky and Popeo, P.C.

(57) ABSTRACT

A hybrid rocket motor includes a supply of oxidizer, a first solid fuel element positioned around the supply of oxidizer, a second solid fuel element positioned concentrically around the first solid fuel element, and a combustion port positioned between the first and second solid fuel elements. The oxidizer interacts with the first and second solid fuel elements within the combustion port to produce a combustion product. A nozzle is in communication with the combustion port for combustion discharge of the combustion product.

14 Claims, 3 Drawing Sheets

FIG. 3

HYBRID ROCKET MOTOR WITH ANNULAR, CONCENTRIC SOLID FUEL ELEMENTS

REFERENCE TO PRIORITY DOCUMENT

This application claims priority of U.S. Provisional Patent Application Ser. No. 60/818,001 filed Jun. 29, 2006. Priority of the aforementioned filing date is hereby claimed and the disclosure of the Provisional Patent Application is hereby incorporated by reference in its entirety.

BACKGROUND

This disclosure relates to propulsion systems, and more particularly to a hybrid propulsion system.

Liquid systems and solid systems are the two basic types of rocket propulsion systems that are most widely used in the rocket industry. In a solid propellant system, solid rocket fuel and an oxidizer are mixed together and allowed to cure inside a rocket case to form a solid propellant material, which is then ignited in the rocket case. Upon ignition, pressure forms within the rocket case and gases are released through a nozzle to produce thrust. In a solid propellant system, the solid propellant burns uninterrupted until all the propellant is exhausted, which can be undesirable in certain circumstances.

In a liquid system, a liquid oxidizer is fed into a combustion chamber in combination with a liquid fuel. The oxidizer and liquid fuel are mixed in the combustion chamber, where they react to produce gases under high temperature and high pressure. The gases exhaust through a nozzle from the combustion chamber to thereby produce thrust. Although widely used, there are certain drawbacks associated with liquid propulsion systems.

Another type of rocket propulsion system is the hybrid system. A hybrid system combines aspects of both liquid systems and solid systems in that one propellant is stored as a solid and another propellant is stored as a liquid. In a typical system, the solid material is used as the fuel and the liquid material is used as the oxidizer. A variety of materials can be used as the solid fuel, including Plexiglas (polymethyl methacrylate (PMMA)), high density polyethylene (HDPE), hydroxyl terminated polybutadiene (HTPB), etc. Nitrous Oxide is a commonly used as the oxidizer, although other oxidizers can be used.

SUMMARY

There is currently a need for improved hybrid rocket systems. Disclosed is an improved hybrid rocket system. In one aspect, there is disclosed a hybrid rocket motor comprising a supply of oxidizer, a first solid fuel element positioned around the supply of oxidizer, a second solid fuel element positioned concentrically around the first solid fuel element, and a combustion port positioned between the first and second solid fuel elements. The oxidizer interacts with the first and second solid fuel elements within the combustion port to produce a combustion product. A nozzle is in communication with the combustion port for combustion discharge of the combustion product.

In another aspect, there is disclosed a hybrid rocket motor, comprising a oxidizer tank containing an oxidizer, a main casing surrounding the oxidizer tank, and at least one injector adapted to inject oxidizer from the oxidizer tank into the main casing. The main casing includes a first, annular solid fuel grain; a second, annular solid fuel grain positioned concentrically around the first, annular solid fuel grain; a combustion port positioned between the first and second annular solid fuel grains wherein the oxidizer interacts with the first and second solid fuel elements within the combustion port to produce a combustion product; and a nozzle in communication with the combustion port for combustion discharge of the combustion product.

The details of one or more embodiments are set forth in the accompanying drawings and the description below. Other features, objects, and advantages will be apparent from the description and drawings, and from the claims.

DETAILED DESCRIPTION

Figure 1:
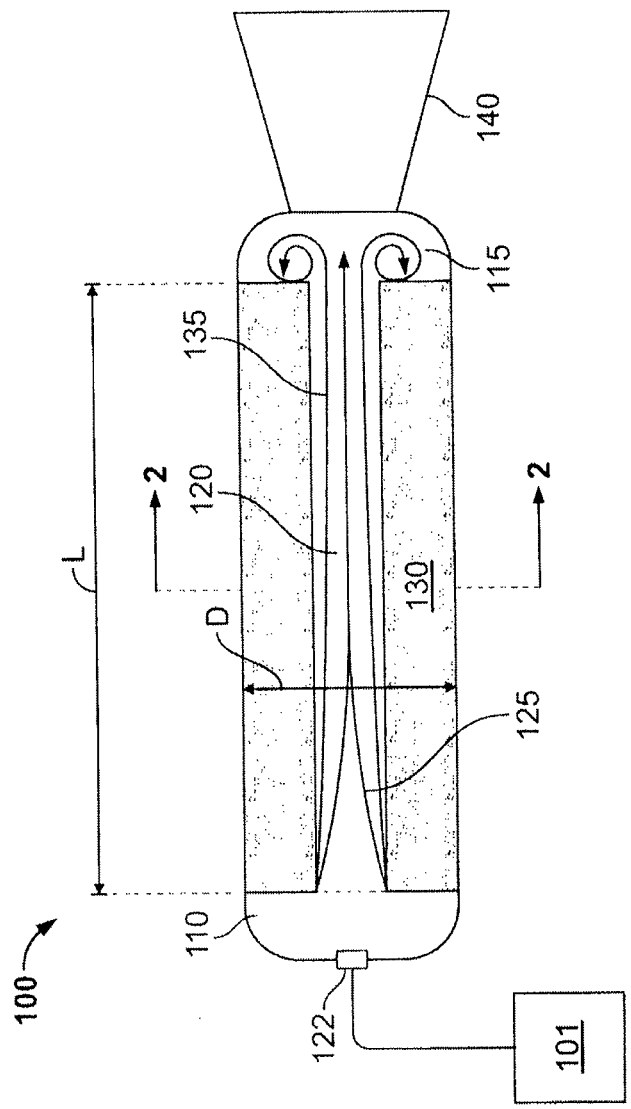
FIG. 1 is a schematic view of a single port hybrid rocket motor.

FIG. 1 shows a schematic of the configuration of a conventional, single port hybrid rocket motor 100. The motor 100 generally includes a liquid fuel tank 101 coupled to a main tank or casing 102. The casing 102 encloses a combustion chamber 110, a mixing chamber 115, and an elongate combustion port 120 extending therebetween. A solid fuel or "grain" 130 is located within the casing 102. As shown in the cross-sectional view of FIG. 2, the solid fuel grain 130 may have a "wagon wheel" cross-sectional shape such that the solid fuel grain is divided into wedge-shaped portions 136 that are arranged around a central port. It should be appreciated that the portions 136 do not have to be wedge-shaped and that any quantity of portions can be used.

The wedge-shaped portions 136 have spaces therebetween that form the combustion port 120, which extends along the axial length of the grain 130. The combustion port 120 permit combustion gas to flow across the length of the solid fuel grain, as described below. With reference to FIG. 1, the solid fuel grain has a length L and a diameter D. It is generally desirable to maximize the ratio of the length L to the diameter D in order to improve performance of the rocket motor 100.

With reference still to FIG. 1, an injector 122 communicates with the combustion chamber 110 for injecting a liquid phase oxidizer from the liquid fuel tank 101 into the combustion chamber 110. In use, the oxidizer is injected into the combustion chamber 110 via the injector 122. The injected oxidizer is gasified and flows axially along the combustion port 120. This forms a boundary layer edge 125 over the exposed surfaces of the solid fuel grain 130. The boundary layer edge 125 is usually turbulent in nature over a large portion of the length of the combustion port 120. A diffusion flame zone 135 exists within the boundary layer edge 125, which diffusion flame zone 135 extends over the entire length of the solid fuel 130.

The heat generated in the flame, which is located approximately 20-30% of the boundary layer thickness above the fuel surface, is transferred to the wall mainly by convection. The wall heat flux evaporates the solid fuel and the resultant fuel vapor is transported to the flame where it reacts with the oxidizer, which is transported from the free stream by turbulent diffusion mechanisms. The unburned fuel that travels beneath the flame, the unburned oxidizer in the free stream, and the flame combustion products mix and further react in the mixing chamber 115. The hot gases expand through a nozzle 140 to deliver the required thrust.

Figure 2:
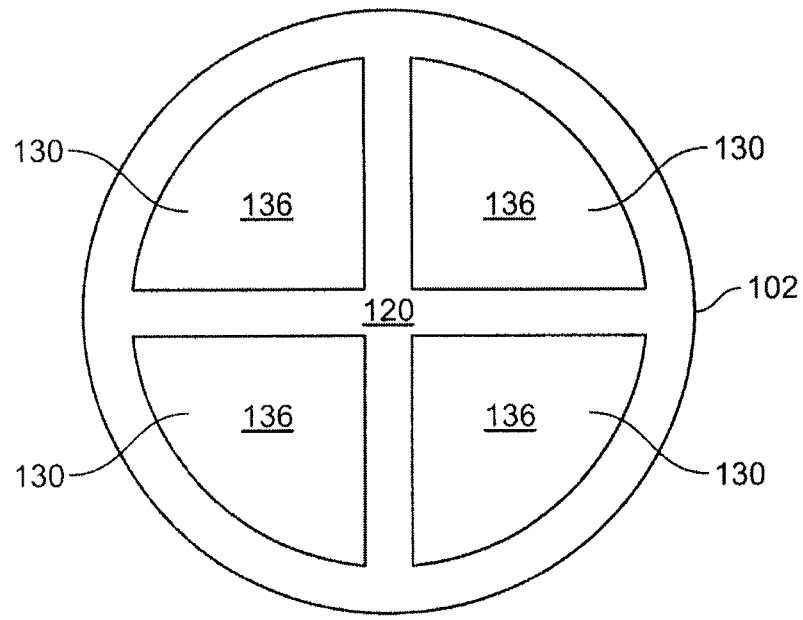
FIG. 2 is a cross-sectional view of the motor of FIG. 1 along line 2-2 of FIG. 1.

The "wagon wheel" solid fuel grain configuration shown in FIG. 2 can provide a beneficial ratio of exposed surface area to cross sectional area for the solid fuel grain. However, the wagon wheel design has disadvantages. For example, due to the slow burning rate of the fuel, the fuel grain webs become very thin during the last portion of the burn and the motor has to be shut down. This undesirably results in a high residual. It has been attempted to reinforce the wagon wheel fuel grain by incorporating solid stiffening sheets in the spoke or web portions of the grain. This too has not proven satisfactory since the fuel grain tends to separate from the solid sheets during burning.

Figure 3:
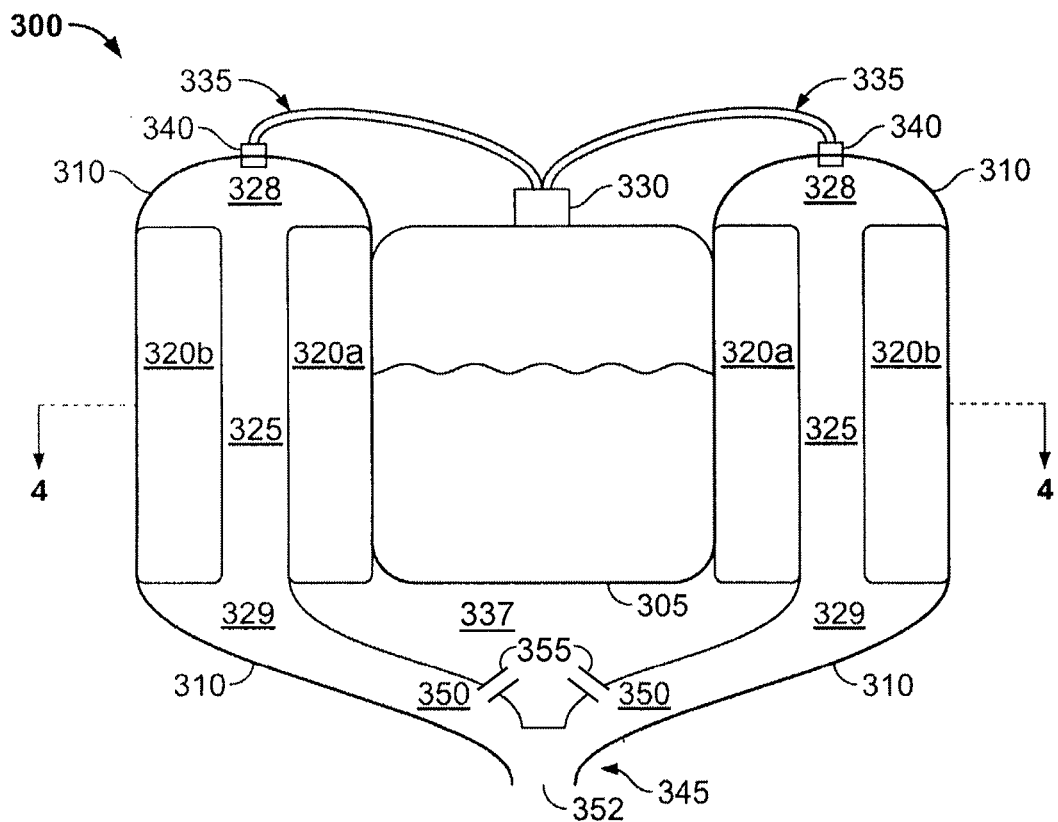
FIG. 3 is a schematic side view of a hybrid rocket motor having concentric fuel grains.
Figure 4:
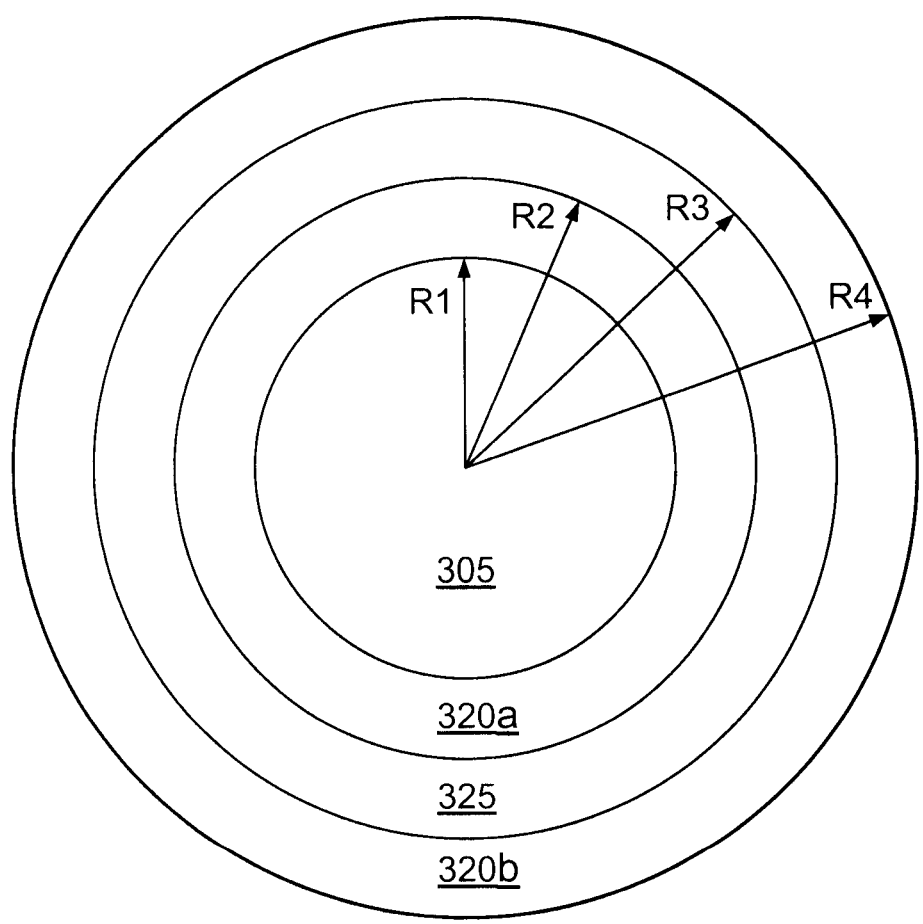
FIG. 4 is a cross-sectional view of the motor of FIG. 3.

The disadvantages of such a configuration can be overcome using the hybrid rocket motor of the present invention. FIG. 3 shows a side, cross-sectional view of an exemplary embodiment of the hybrid rocket motor 300 that is configured in accordance with the present invention. FIG. 4 shows a downward cross-sectional view of the motor 300 along lines 4-4 of FIG. 3. The motor 300 includes a central, liquid fuel tank 305 that is surrounded by an annular, outer casing 310. The liquid fuel tank 305 contains a liquid fuel or oxidizer. The outer casing 310 contains a pair of solid fuel grains or members (referred to individually using reference numerals 320a, 320b and collectively using reference numeral 320). The solid fuel members 320 are annular and are arranged in a concentric manner around one another and the liquid fuel tank 305, as described in more detail below. An annular combustion port 325 is formed between the two solid fuel members 320. The combustion port 325 extends along the axial length of the solid fuel members 320 in the space between the solid fuel members 320. The combustion port 325 provides a communicative pathway between a combustion chamber 328 and a mixing chamber 329.

As best shown in the cross-sectional view of FIG. 4, the solid fuel members 320 are ring-like and substantially circular in cross-sectional shape with the combustion port 325 being formed therebetween. The solid fuel members 320 need not be circular, but can have other shapes. In addition, there can be additional solid fuel members that are concentrically arranged around the solid fuel members 320a and 320b.

With reference still to FIG. 4, the dimensions of the liquid fuel tank 305, the solid fuel elements 320, and the combustion port 325 can be at least partially defined by radii R1-R4. The liquid fuel tank 305 has an outer radius R1, the solid fuel element 320a has an outer radius R2, the combustion port 325 has an outer radius R3, and the solid fuel element 320b has an outer radius R4, with the radii being relative to a center point C.

With reference to FIG. 3, a liquid fuel port 330 is disposed in communication with the liquid fuel tank 305, such as at an upper region of the liquid fuel tank 305. The liquid fuel port 330 is adapted to facilitate the transfer liquid fuel from the liquid fuel tank 305 into the combustion chamber 328. In this regard, the liquid fuel port 330 includes an opening that communicates with the interior of the liquid fuel tank 305 such that the liquid fuel can exit the liquid fuel tank 305 via the port 330. The liquid fuel port 330 communicates with one or more conduits 335 through which the liquid fuel can flow toward the combustion chamber 328. Each of the conduits terminates in an injector 340 that communicates with the combustion chamber 328. It should be appreciated that the motor 300 can include any quantity of conduits and injectors. In one embodiment, a plurality of conduits communicate with a plurality of injectors with the injectors being spaced evenly or sporadically around the circumference of the upper region of the combustion chamber 328.

With reference now to FIG. 3, the outer casing 310 tapers moving downward along the motor 300. In this manner, the outer casing 310 forms into a nozzle region 345 at the bottom end of the casing 310. The nozzle-region 345 includes an internal throat 350 formed within the bottom region of the casing 310. At its upper end, the throat 350 communicates with the combustion port 325 and the mixing chamber 329. The throat 350 also communicates with the outside environment at an opening 352 at a lower end. In one embodiment, the nozzle region 345 comprises an aerospike.

A space 337 is positioned below the liquid fuel tank 305 and below the fuel element 320a. The space 337 can be used for various purposes. In one embodiment, the space 337 communicates with the throat 350 via one or more holes or passageways 355 therebetween. The passageways 355 can be used to facilitate liquid injection vector thrust control (LITVC) of the nozzle 345. Other uses of the space 337 are also possible.

As discussed, the liquid fuel tank 305 contains a liquid fuel or oxidizer. The type of liquid fuel can vary. In one embodiment, the liquid fuel comprises liquid oxygen (O2). The type of solid fuel can also vary. In one embodiment, the solid fuel is plexiglass.

In use, the oxidizer flows out of the liquid fuel tank 305 via the port 330. The oxidizer flows through the conduits 335 toward the combustion port 325 and is injected therein using the injector(s) 340. The injected oxidizer is gasified and flows axially along a combustion port 325 between the solid fuel members 320. Ignition causes combustion of the fuel-oxidizer mixture at the exposed surfaces of the fuel grain, resulting in the generation of thrust as the high pressure combustion products are discharged through the rocket nozzle 345.

A number of embodiments have been described. Nevertheless, it will be understood that various modifications may be made without departing from the spirit and scope of the claims. Accordingly, other embodiments are within the scope of the following claims.

What is claimed:

1. A hybrid rocket motor, comprising:
   an oxidizer tank containing a supply of oxidizer;
   a first, annular solid fuel element positioned around the supply of oxidizer;
   a second solid fuel element positioned concentrically around the first solid fuel element;
   a combustion port positioned between the first and second solid fuel elements, wherein the oxidizer interacts with the first and second solid fuel elements within the combustion port to produce a combustion product; and
   a nozzle in communication with the combustion port for combustion discharge of the combustion product;
   wherein a generally enclosed space is positioned below the oxidizer tank and below the first solid fuel element, such that the widest diameter of the generally enclosed space is substantially equal to the outer diameter of the first, annular solid fuel element, wherein the space communicates with a throat of the nozzle via at least one passageway therebetween and wherein the at least one passageway can be used to facilitate liquid injection vector thrust control of the nozzle.

2. A hybrid rocket motor as in claim 1, wherein the second solid fuel element is annular.

3. A hybrid rocket motor as in claim 1, wherein the oxidizer comprises Nitrous Oxide.

4. A hybrid rocket motor as in claim 1, wherein the first and second solid fuel elements comprise polymethyl methacrylate, high density polyethylene, or hydroxyl terminated polybutadiene.

5. A hybrid rocket motor as in claim 1, wherein the first and second solid fuel elements are contained within a solid fuel tank that surrounds the supply of oxidizer.

6. A hybrid rocket motor as in claim 5, further comprising at least one injector adapted to inject oxidizer from the supply of oxidizer into the solid fuel tank.

7. A hybrid rocket motor as in claim 5, further comprising a plurality of injectors spaced around a circumference of the solid fuel tank.

8. A hybrid rocket motor as in claim 1, wherein the hybrid rocket motor comprises an aerospike.

9. A hybrid rocket motor, comprising: an oxidizer tank containing an oxidizer; a main casing surrounding the oxidizer tank; at least one injector adapted to inject oxidizer from the oxidizer tank into the main casing; wherein the main casing includes:
   a first, annular solid fuel element;
   a second, annular solid fuel element positioned concentrically around the first, annular solid fuel element;
   a combustion port positioned between the first and second annular solid fuel elements wherein the oxidizer interacts with the first and second solid fuel elements within the combustion port to produce a combustion product; and
   a nozzle in communication with the combustion port for combustion discharge of the combustion product;
   wherein a generally enclosed space is positioned below the oxidizer tank and below the first, annular solid fuel element, such that the widest diameter of the generally enclosed space is substantially equal to the outer diameter of the first, annular solid fuel element, wherein the space communicates with a throat of the nozzle via at least one passageway therebetween and wherein the at least one passageway can be used to facilitate liquid injection vector thrust control of the nozzle.

10. A hybrid rocket motor as in claim 9, wherein the hybrid rocket motor comprises an aerospike.

11. A hybrid rocket motor as in claim 9, wherein the at least one injector comprises a plurality of injectors spaced around a circumference of the main casing.

12. A hybrid rocket motor as in claim 9, wherein the oxidizer comprises Nitrous Oxide.

13. A hybrid rocket motor as in claim 9, wherein the first and second solid fuel elements comprise polymethyl methacrylate, high density polyethylene, or hydroxyl terminated polybutadiene.

14. A hybrid rocket motor as in claim 9, further comprising a third solid fuel element concentrically surrounding the second solid fuel element.

* * * * *

UNITED STATES PATENT AND TRADEMARK OFFICE
CERTIFICATE OF CORRECTION

Page 1 of 1

PATENT NO.        : 8,539,753 B2
APPLICATION NO.   : 11/764677
DATED             : September 24, 2013
INVENTOR(S)       : Frank Macklin It is certified that error appears in the above-identified patent and that said Letters Patent is hereby corrected as shown below:

In the Specification

In Column 2, line 40, "port 120 permit" should read --port 120 permits--.

In Column 3, line 55, "is adapted to facilitate the transfer liquid from" should read --is adapted to facilitate the transfer of liquid from--.

Signed and Sealed this
Thirty-first Day of December, 2013

Margaret A. Focarino
*Commissioner for Patents of the United States Patent and Trademark Office*